US012562827B2

(12) United States Patent
Zhang et al.

(10) Patent No.: US 12,562,827 B2
(45) Date of Patent: Feb. 24, 2026

(54) DETERMINING DEFAULT BEAM AND QCL COLLISION HANDLING

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 17/593,410

(22) PCT Filed: May 14, 2020

(86) PCT No.: PCT/CN2020/090291

§ 371 (c)(1),
(2) Date: Sep. 17, 2021

(87) PCT Pub. No.: WO2021/226946

PCT Pub. Date: Nov. 18, 2021

(65) Prior Publication Data

US 2022/0311579 A1      Sep. 29, 2022

(51) Int. Cl.
*H04B 17/309*      (2015.01)
*H04L 5/00*      (2006.01)

(52) U.S. Cl.
CPC ......... *H04B 17/347* (2023.05); *H04L 5/0053* (2013.01)

(58) Field of Classification Search
CPC ..... H04L 5/0053; H04L 5/0051; H04W 72/12
See application file for complete search history.

(56) References Cited

U.S. PATENT DOCUMENTS

2019/0297603 A1      9/2019  Guo et al.
2019/0306850 A1*    10/2019  Zhang .................. H04B 7/0626
(Continued)

FOREIGN PATENT DOCUMENTS

CN      110535617      12/2019
CN      111092707      5/2020
(Continued)

OTHER PUBLICATIONS

MTI, "Remaining issues on Beam Management"; 3GPP TSG-RAN WG1 #95; R1-1813245; Nov. 16, 2018, 5 sheets.

*Primary Examiner* — Siming Liu
(74) *Attorney, Agent, or Firm* — Fay Kaplun & Marcin, LLP

(57) ABSTRACT

Embodiments include a computer readable storage medium, a user equipment, a method and an integrated circuit that perform operations. The operations include receiving a plurality of control resource sets (CORESETs), selecting a CORESET, wherein the CORESET includes one or more active transmission configuration indicator (TCI) states and determining a default beam or a pathloss reference signal (RS) based on a TCI state. Further operations include receiving a beam indication for a physical downlink control channel (PDCCH), wherein the PDCCH is received via one or more CORESETS, each having a plurality of TCIs, determining if the PDCCH collides with a second signal and determining whether to (a) drop the PDCCH or the second signal or (b) base a quasi co-location (QCL) of one of the PDCCH or the second signal on a QCL of the other one of the second signal or the PDCCH.

11 Claims, 8 Drawing Sheets

(56) References Cited

U.S. PATENT DOCUMENTS

| | | | | |
|---|---|---|---|---|
| 2019/0312698 | A1* | 10/2019 | Akkarakaran | ........ H04W 52/42 |
| 2019/0373450 | A1* | 12/2019 | Zhou | ..................... H04L 5/0092 |
| 2020/0067674 | A1 | 2/2020 | Guan et al. | |
| 2020/0267667 | A1* | 8/2020 | MolavianJazi | ....... H04W 52/48 |
| 2020/0314664 | A1* | 10/2020 | Zhou | ................... H04L 25/0226 |
| 2021/0195626 | A1* | 6/2021 | Venugopal | ............ H04W 72/51 |
| 2021/0227526 | A1* | 7/2021 | Khoshnevisan | ...... H04L 5/0094 |
| 2022/0174593 | A1* | 6/2022 | Teyeb | ................... H04W 24/08 |

FOREIGN PATENT DOCUMENTS

| | | |
|---|---|---|
| CN | 111148239 | 5/2020 |
| WO | 2019/099659 | 5/2019 |
| WO | 2019/153347 | 8/2019 |
| WO | 2020/051903 | 3/2020 |

* cited by examiner

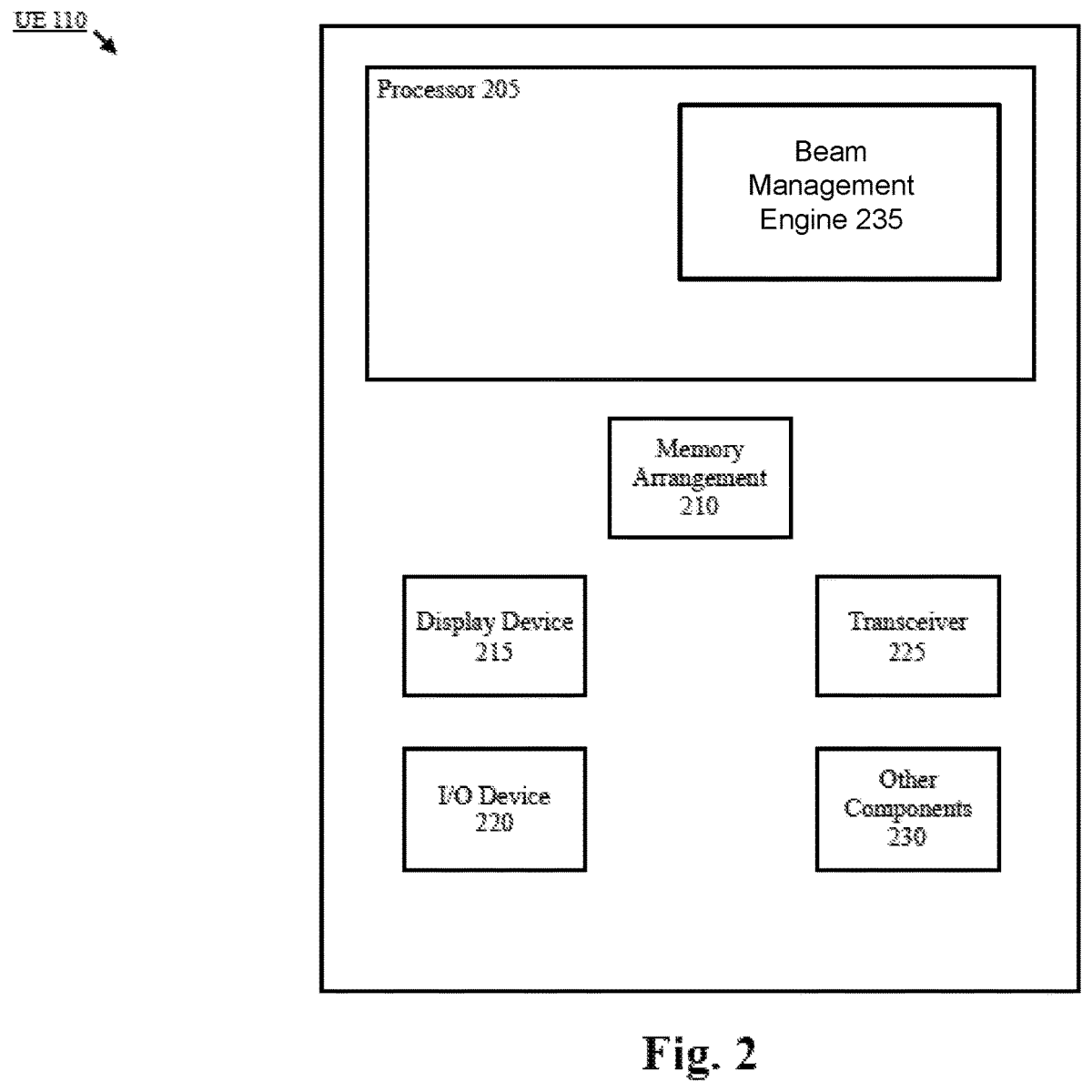

UE 110

Processor 205

Beam
Management
Engine 235

Memory
Arrangement
210

Display Device
215

Transceiver
225

I/O Device
220

Other
Components
230

Fig. 2

Method 530

Method 550

Method 600

Method 630

DETERMINING DEFAULT BEAM AND QCL COLLISION HANDLING

BACKGROUND

A user equipment (UE) may establish a connection to at least one of a plurality of different networks or types of networks. When establishing the network connection such as, for example, a connection to a 5G new radio (NR) network, a next generation NodeB (gNB) transmits downlink control information (DCI) to the UE via a physical downlink control channel (PDCCH). One type of information on the PDCCH is a beam which the UE should use to receive a physical downlink shared channel (PDSCH) transmission. However, regardless of which beam is identified in the PDCCH, if a scheduling offset of the PDSCH is below a threshold, the UE may use a default beam to receive the PDSCH.

The PDCCH is transmitted to the UE via one or more control resource sets (CORESETS), each of which includes a transmission configuration indicator (TCI) state configured by the gNB. The PDCCH may also include synchronization signal block (SSB) and channel state information (CSI)-reference signals (RS). Similar to the PDSCH, if the CSI-RS has a scheduling offset below a threshold, the UE may use a default beam to receive the CSI-RS.

At times, quasi co-location (QCL)-typeD collisions occur when the gNB sends multiple signals (e.g., 2) in the same symbol to the UE. The UE would need to use different beams to receive each signal. However, the UE may only use one beam at a time to receive a signal. As such, the UE determines collision handling plan for different signal collisions.

SUMMARY

Some exemplary embodiments are related to a computer readable storage medium comprising a set of instructions that when executed by a processor cause the processor to perform operations. The operations include receiving a plurality of control resource sets (CORESETs), selecting a CORESET from the plurality of CORESETs, wherein the CORESET includes one or more active transmission configuration indicator (TCI) states and determining a default beam or a pathloss reference signal (RS) based on a TCI state of the one or more TCI states.

Further exemplary embodiments are related to a user equipment (UE) having a transceiver and a processor. The transceiver is configured to receive a plurality of control resource sets (CORESETs). The processor is configured to select a CORESET from the plurality of CORESETs, wherein the CORESET includes one or more active transmission configuration indicator (TCI) states, and determine a default beam or a pathloss reference signal (RS) based on a TCI state of the one or more TCI states.

Still further exemplary embodiments are related to a computer readable storage medium comprising a set of instructions that when executed by a processor cause the processor to perform operations. The operations include receiving a beam indication for a physical downlink control channel (PDCCH), wherein the PDCCH is received via one or more control resource sets (CORESETS), each having a plurality of transmission configuration indicators (TCIs), determining if the PDCCH collides with a second signal and determining, when the PDCCH collides with the second signal, whether to (a) drop the PDCCH or the second signal or (b) base a quasi co-location (QCL) of one of the PDCCH or the second signal on a QCL of the other one of the second signal or the PDCCH.

BRIEF DESCRIPTION OF THE DRAWINGS

FIG. 2 shows an exemplary UE according to various exemplary embodiments.

DETAILED DESCRIPTION

Figure 1:
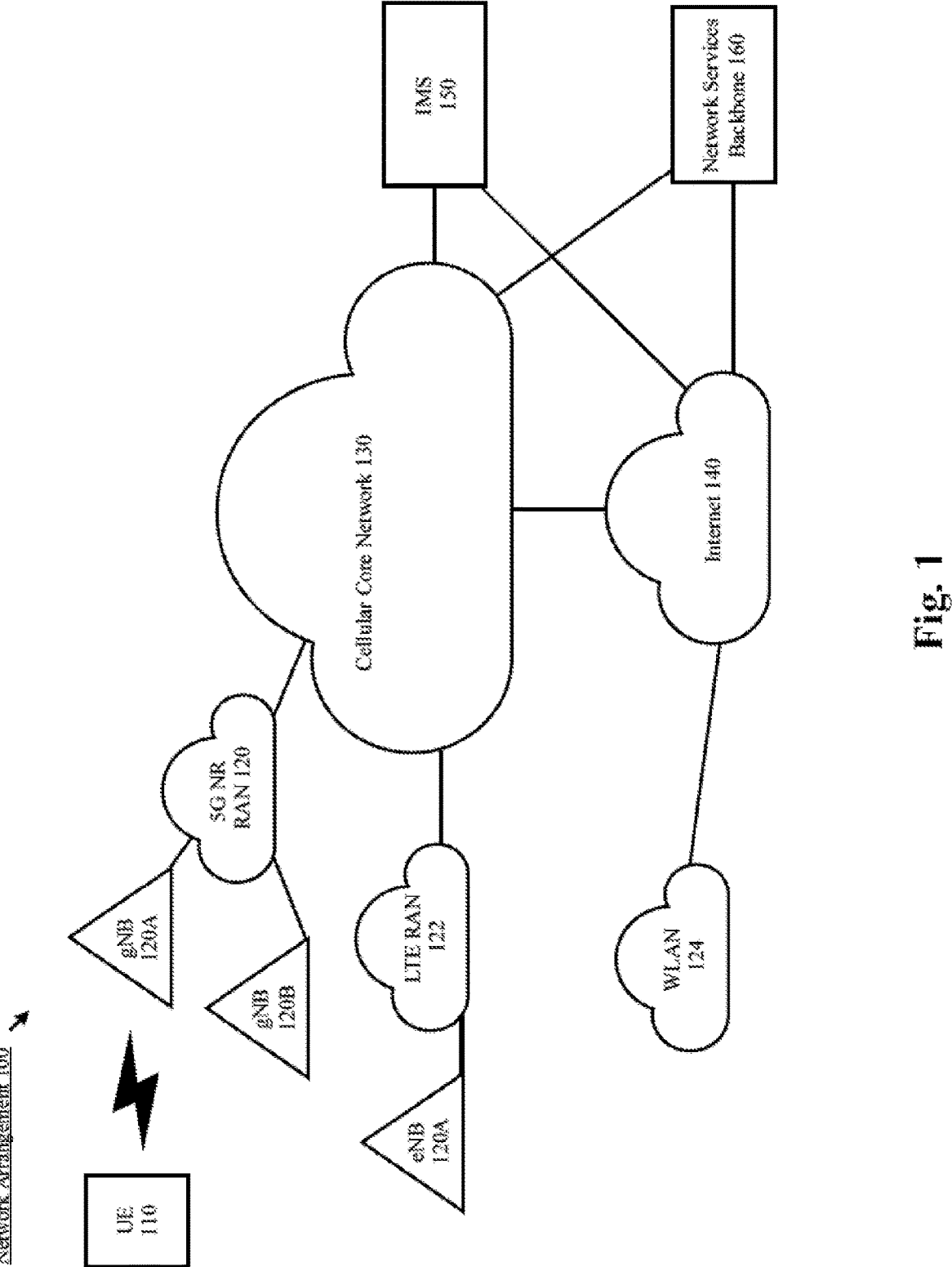
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to selecting a default beam and handling quasi co-location (QCL)-typeD collisions by a user equipment (UE) communicating with a gNB of a 5G new radio (NR) network. The exemplary embodiments improve the reception and robustness of reception of the PDCCH by the UE.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to 5G new radio (NR) radio access technology (RAT). However, it should be understood that 5G NR is being used for illustrative purposes and the exemplary embodiments may be applied to any network that exhibits the characteristics and functionalities described below for the 5G NR network.

Current physical downlink control channel (PDCCH) transmissions are typically configured with one transmission configuration indicator (TCI) state for each CORESET. As such, each PDCCH is transmitted (and received) via one beam. Release 15 and Release 16 of 5G NR include multi-TCI state CORESETs. One issue that exists however is how to determine the default beam (for downlink) or pathloss reference signal (RS) given a multi-TCI state CORESET.

According to exemplary embodiments, if the number of configured TCI states in a CORESET is greater than one (1), the UE selects one TCI state based on predetermined criteria and determines a default beam/pathloss RS based on the selected TCI state.

Another issue that exists with multi-TCI configured CORESETs is QCL-typeD collisions between the PDCCH and other downlink signals since the gNB may transmit two signals (e.g., PDCCH and PDSCH) in the same symbol whereas the UE can only utilize one reception (Rx) beam at a time.

According to exemplary embodiments, the UE determines how to handle the collision based on the type of signal involved. For example, the UE may choose to drop one of the signals or override the beam of one signal and QCL that beam with the other signal's beam. Each of these exemplary embodiments are described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a beam management engine 235. The beam management engine 235 may perform various operations related to determining a default beam/pathloss RS based on a TCI state of a CORESET and determining how to handle a QCL-typeD collision of a PDCCH with another downlink signal.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3A:
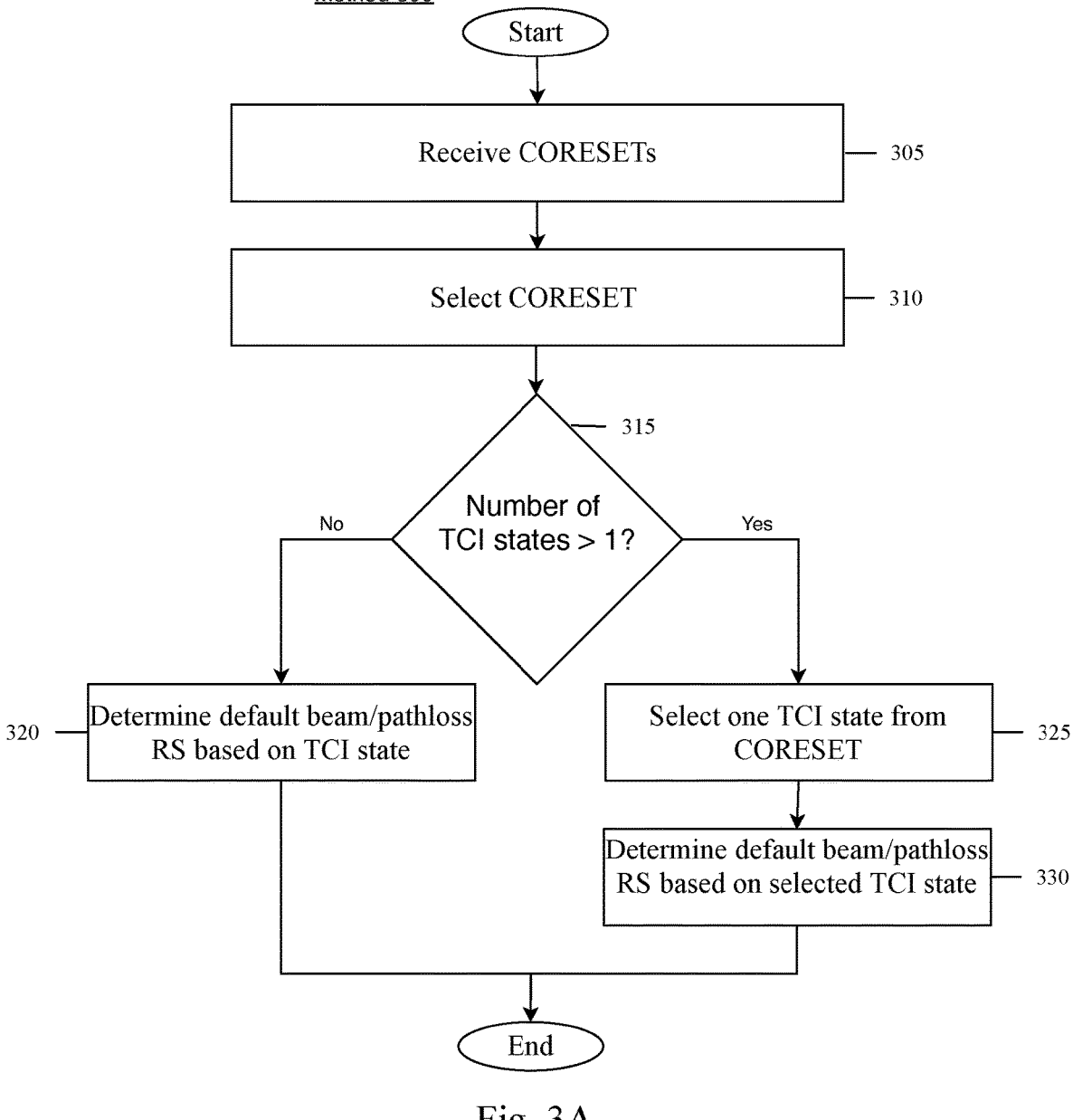
FIGS. 3A-3B show methods of determining a default beam/pathloss reference signal (RS) according to various exemplary embodiments.
Figure 3B:
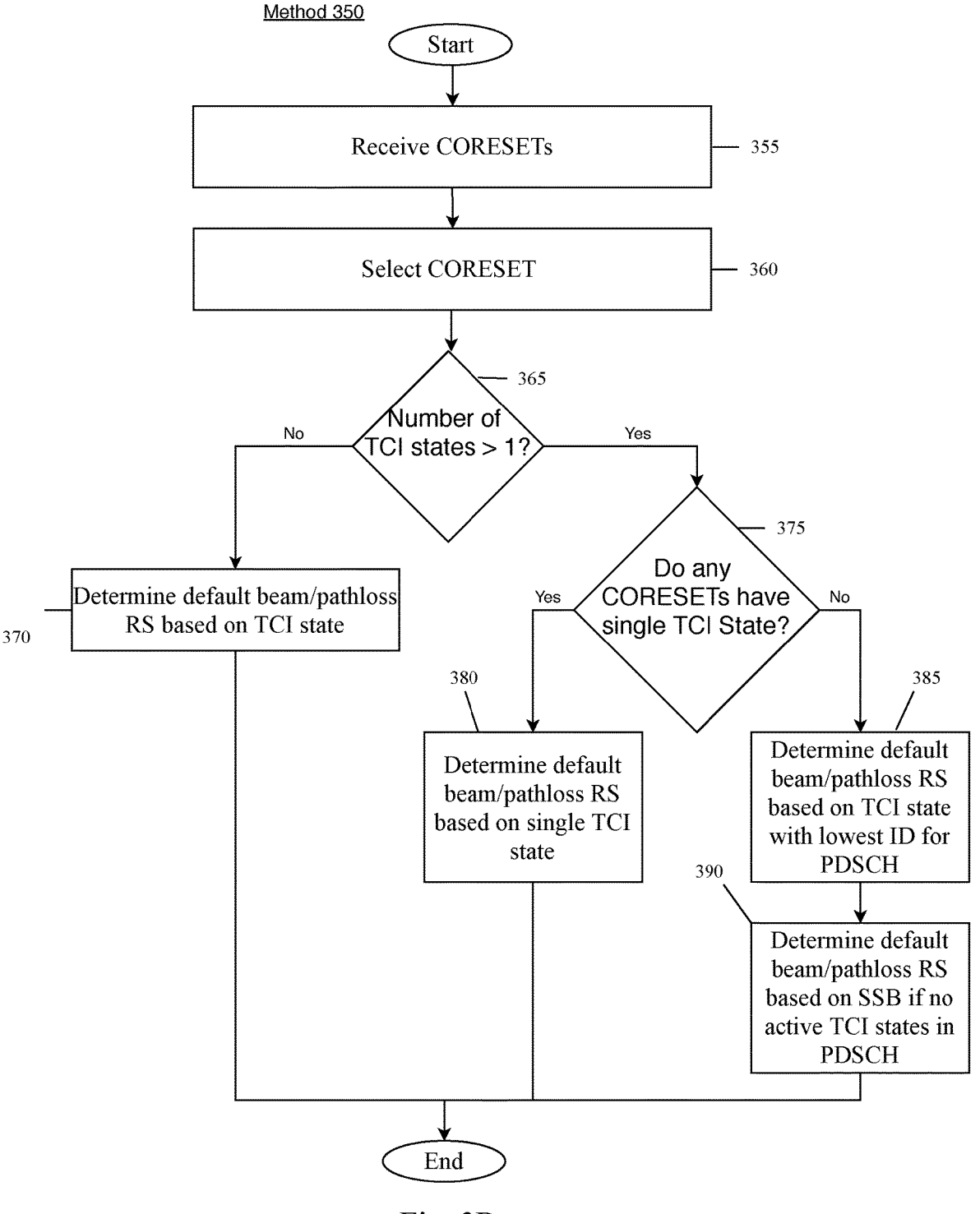

FIGS. 3A and 3B show methods 300 and 350, respectively, of determining a default beam/pathloss reference signal (RS) according to various exemplary embodiments. The description of FIGS. 3A and 3B is applicable, for example, to cases in which the PDSCH/aperiodic CSI-RS has a scheduling offset below a threshold, the PUSCH is triggered by DCI Format 0_0 when there is no PUCCH configured, and the PUCCH/SRS are not configured with a spatial relation and pathloss RS. It should be understood that where the SRS with usage is configured as beam management and SRS with usage is configured as non-codebook and with associated CSI-RS configured are excluded from the exemplary embodiments. However, there may be other scenarios when this description is applicable outside of these examples. It should also be understood that different options may be applied to different channels and that basing the default beam selection in one channel may be unrelated to selecting the default beam in another channel.

As shown in FIG. 3A, the method 300 begins at 305, where the UE 110 receives one or more CORESETs from the gNB 120A or 120B. At 310, the UE 110 selects one of the CORESETs for default beam determination. At 315, the UE determines whether the CORESET is configured with more than one active TCI state. If not, at 320, the UE 110 determines the default beam (for downlink) or pathloss RS (for uplink) based on the singular active TCI state.

If the CORESET is configured with more than one TCI state, however, the UE selects one TCI state from the CORESET. In some embodiments, the selection of the TCI may be based on explicit signaling in the downlink control information (DCI) of the PDCCH. In some embodiments, the TCI may be selected based on implicit information determined by the first control channel element (CCE) index of the scheduling PDCCH. In some embodiments, the TCI selection is configured by the gNB via higher layer signaling (e.g., radio resource control (RRC) or medium access control (MAC) control element (CE)). In such an embodiment, the signaling may be configured per CORESET, bandwidth, or serving cell.

In some embodiments, the UE 110 may select the TCI state based on predetermined criteria such as, for example, a TCI ID, a slot index, and/or configurations of the RS configured in the TCI such as, for example, the resource type (e.g., periodic, semi-persistent, aperiodic, periodicity, bandwidth, density, etc.) For example, in some embodiments, the UE 110 may select the TCI having the lowest TCI ID. In some embodiments, the UE 110 may apply a first TCI to an odd slot and a second TCI to an even slot.

In some embodiments, the UE 110 may select the TCI state based on the most recent beam report. The TCI selection for a slot n may be based on the beam report, which indicates, for example, the reference signal received power (RSRP) or signal to interference and noise ratio (SINR) report which is transmitted in slot n-k. In some embodiments, k may be a predefined value. In some embodiments, k may be configured by RRC signaling. In some embodiments, k nay be configured by a capability of the UE 110. The UE 110 may select the TCI state having the highest RSRP/SINR in the latest report. In some embodiments, the UE 110 may define a time window outside of which the latest beam report will not be considered valid. For example, if the UE 110 is moving, the latest beam report may no longer be valid. If all of the RSs are not included in the latest beam report, then the UE 110 may select the TCI state based on the examples described above.

Referring to FIG. 3B, 355-370 are identical to 305-320 of FIG. 3A. If, however, at 365 the UE 110 determines that the number of TCI states in the CORESET is greater than one (1), the UE 110 then determines, at 375, if there are any CORESETS that have only one (1) TCI state. If there is a CORESET having only one (1) TCI state, the UE disregards the CORESETs having more than one TCI state and determines, at 380, the default beam/pathloss RS based on the TCI state of the CORESET having only one (1) TCI state configured. However, if there are no CORESETs that have only one (1) TCI state, then the UE 110 determines, at 385, the default beam/pathloss RS based on the active TCI state with the lowest ID for a scheduled PDSCH. In some embodiments, if there are no active TCI states for the PDSCH, the UE 110 may determine, at 390, the default beam/pathloss RS based on a particular synchronization signal block (SSB) in the serving cell with the lowest cell index in the serving cell group. The SSB may be in the same component carrier (CC) or in a neighboring CC within the same band (serving cell group).

Figure 4:
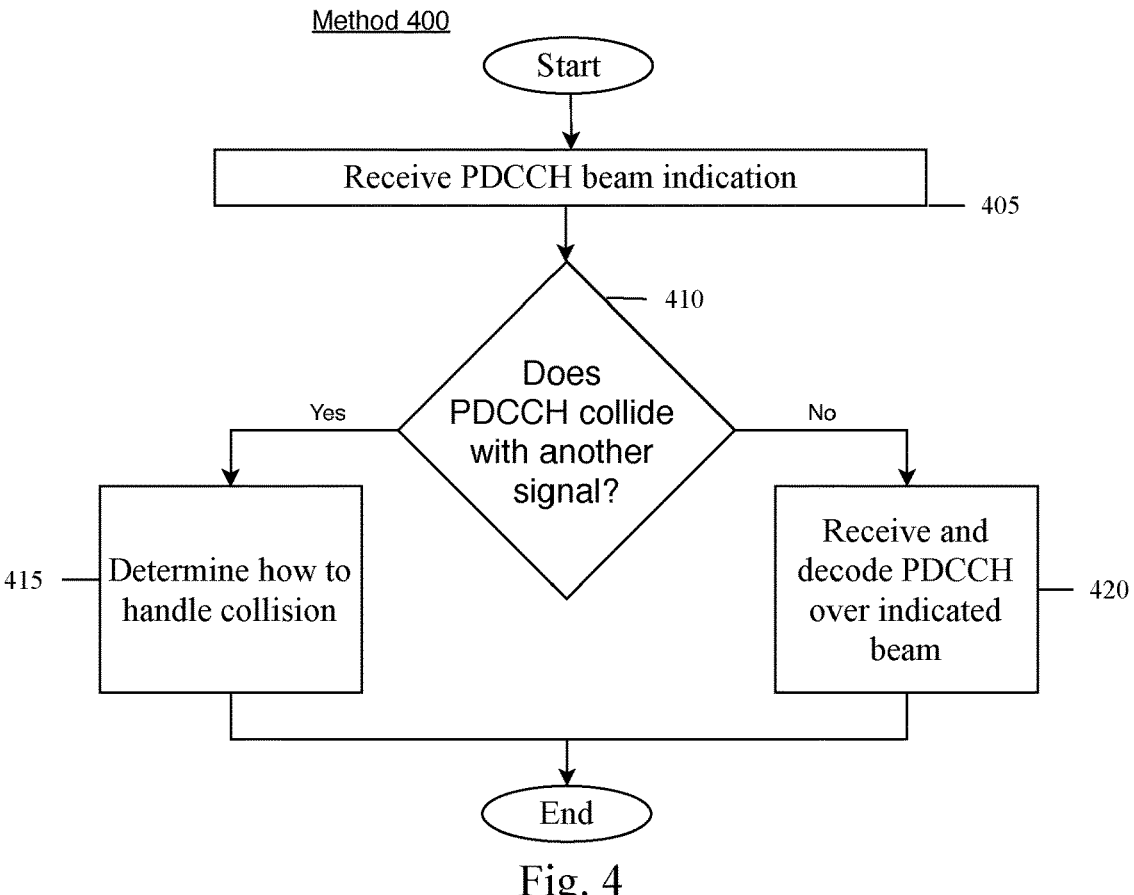
FIG. 4 shows a method of handling signal collisions according to various exemplary embodiments.

FIG. 4 shows a method 400 of handling signal collisions according to various exemplary embodiments. Specific collision handling may be based on the TCI state multiplexing scheme for the CORESET. At 405, the UE 110 receives a PDCCH beam indication from the gNB 120A or 120B. In some embodiments, the PDCCH may be based on a multi-TCI state CORESET. At 410, the UE 110 determines if the PDCCH collides (e.g., a QCL-typeD collision) with another signal (e.g., SSB, CSI-RS, PDSCH). If the UE 110 determines that the PDCCH collides with another signal, the UE 110 determines, at 415, how to handle this collision as will be described in more detail below. If, however, the UE 110 determines that the PDCCH does not collide with another signal, the UE 110 receives and decodes the PDCCH over the indicated beam at 420.

Figure 5A:
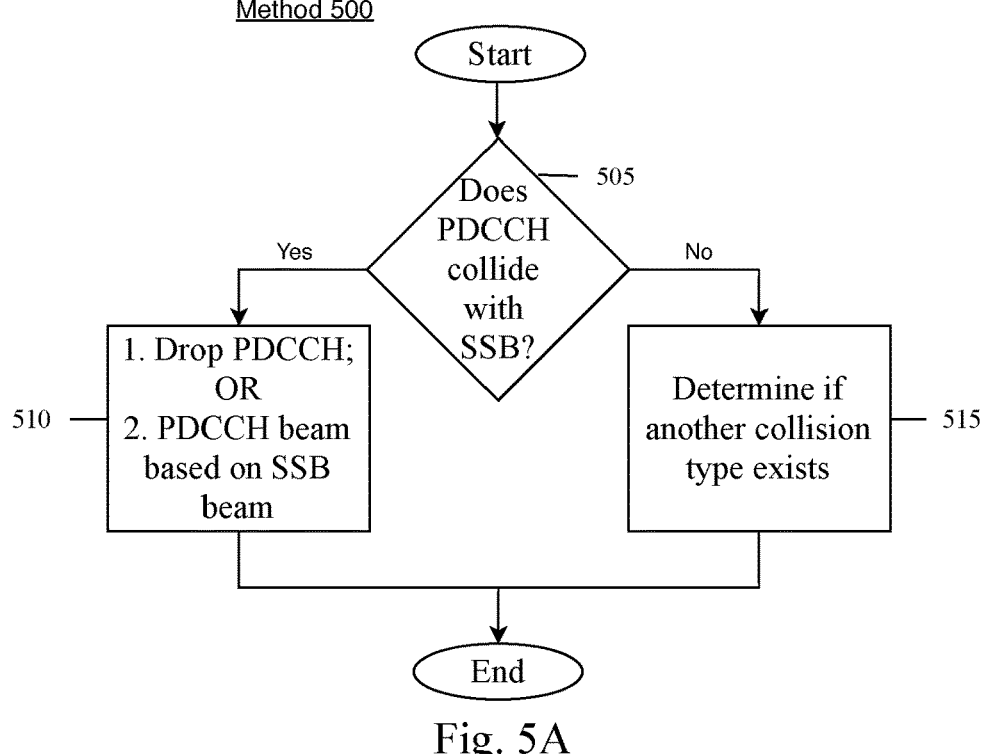
FIGS. 5A-5C shows methods of handling signal collisions for multi-TCI states multiplexed in a TDM manner according to various exemplary embodiments.
Figure 5B:
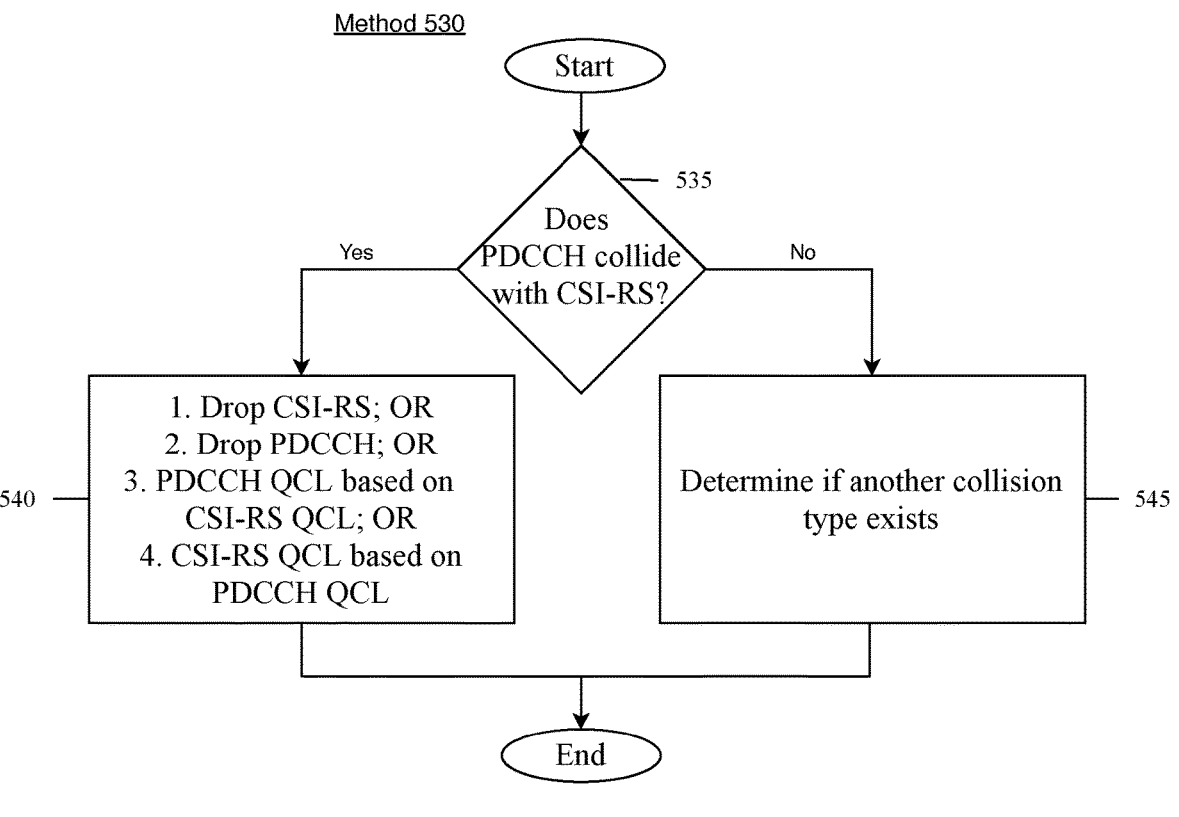
Figure 5C:
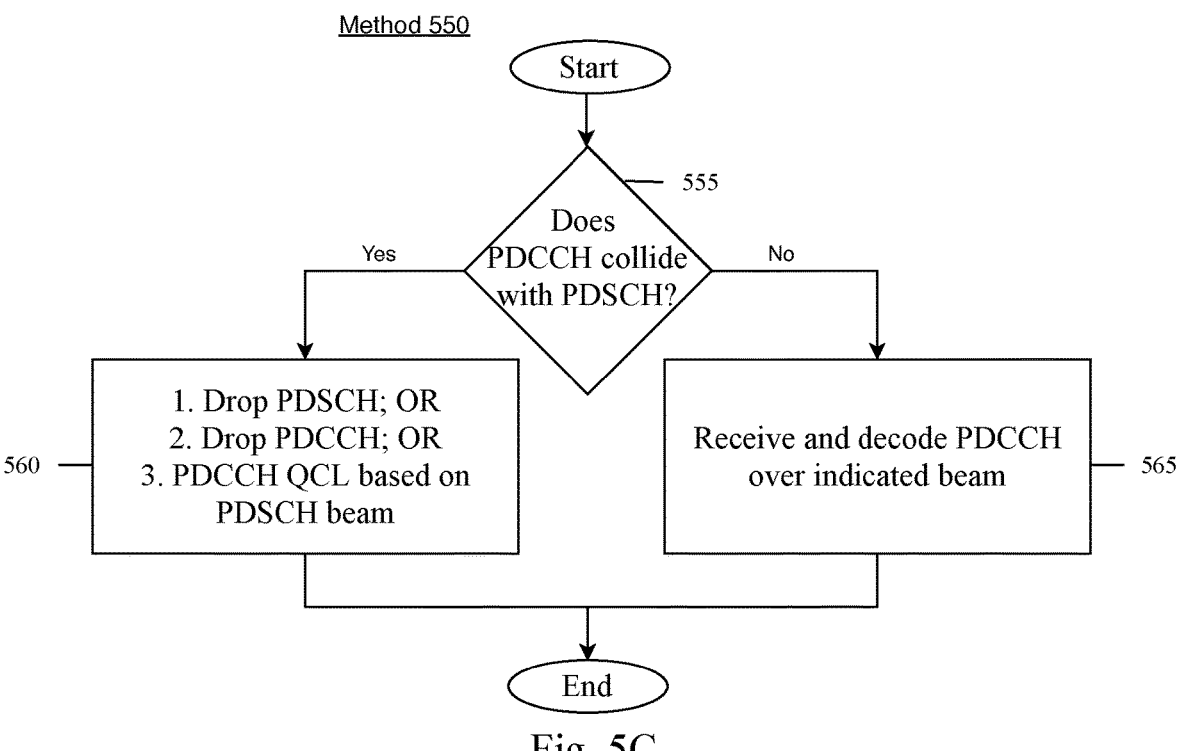

FIGS. 5A-5C shows methods of handling signal collisions for multi-TCI states multiplexed in a time division multiplexing (TDM) manner according to various exemplary embodiments. Thus, FIGS. 5A-5C shows operations that may be performed in 415 of FIG. 4 when the UE 110 determines that there is a collision in 410 of FIG. 4. When the TCI states are multiplexed using TDM, different TCI states may be used for different PDCCH symbols. As depicted in FIGS. 5A-5C, the UE 110 may handle the collision of the PDCCH differently depending on the colliding signal.

FIG. 5A depicts a method 500 of handling a collision of the PDCCH with an SSB. At 505, the UE 110 determines if the PDCCH collides with the SSB. If the PDCCH collides with the SSB, the UE 110 determines how to handle the collision at 510. In some embodiments, the UE 110 may drop (disregard) the PDCCH. In some embodiments, the UE 110 may override the PDCCH beam and base the PDCCH beam on the SSB beam. If however, the PDCCH does not collide with the SSB, at 515, the UE 110 determines if another collision type exists. Other collision types are discussed below with respect to FIGS. 5B and 5C.

Referring to FIG. 5B, a method 530 of handling a collision of the PDCCH with a CSI-RS may continue after 515. At 535, the UE 110 determines if the PDCCH collides with a CSI-RS. If the PDCCH does collide with the CSI-RS, at 540, the UE 110 determines how to handle the collision. In some embodiments, the UE 110 may drop (disregard) the CSI-RS. In some embodiments, the UE 110 may drop the PDCCH. In some embodiments, the UE 110 may base the QCL of the PDCCH on the QCL of the CSI-RS. As such, the TCI state(s) of the CORESET are ignored and only the QCL for the CSI-RS is considered. That is, the QCL for the CSI-RS can be used to override the TCI indication for the CORESET. In some embodiments, the UE 110 may base the QCL of the CSI-RS on the QCL of the PDCCH. When the QCL of the PDCCH is based on the QCL of the CSI-RS and vice versa, the UE 110 ensures that the PDCCH and the CSI-RS are received via the same beam. If the PDCCH does not collide with the CSI-RS, at 545, the UE 110 determines if another collision type exists. It should be understood that different embodiments may be applied to different types of CSI-RS (e.g. CSI-RS for RSRP/SINR measurement, CSI-RS for beam failure detection, CSI-RS for candidate beam detection, CSI-RS for radio link monitoring, CSI-RS for tracking, and CSI-RS for CSI acquisition). It should also be understood that different embodiments may be applied for an aperiodic CSI-RS having scheduling offset below or above a threshold.

Referring to FIG. 5C, a method 550 of handling a collision of the PDCCH with a PDSCH may continue after 545. At 555, the UE 110 determines if the PDCCH collides with a PDSCH. If the PDCCH does collide with the PDSCH, the UE 110, at 560, determines how to handle this collision. In some embodiments, the UE 110 may drop (disregard) the PDSCH. In some embodiments, the UE 110 may drop the PDCCH. In some embodiments, the UE 110 may base the QCL of the PDCCH on the beam over which the PDSCH is transmitted.

If the PDCCH does not collide with the PDSCH, at 565, it is assumed that no collisions exist and the UE 110 may receive and decode the PDCCH over the indicated beam. Although the descriptions of FIG. 5A-5C were made in a specific order, it should be understood that this is only exemplary and that the methods 500, 530, and 550 may be performed in any order and are intended as an elaboration of 415 of method 400.

Figure 6A:
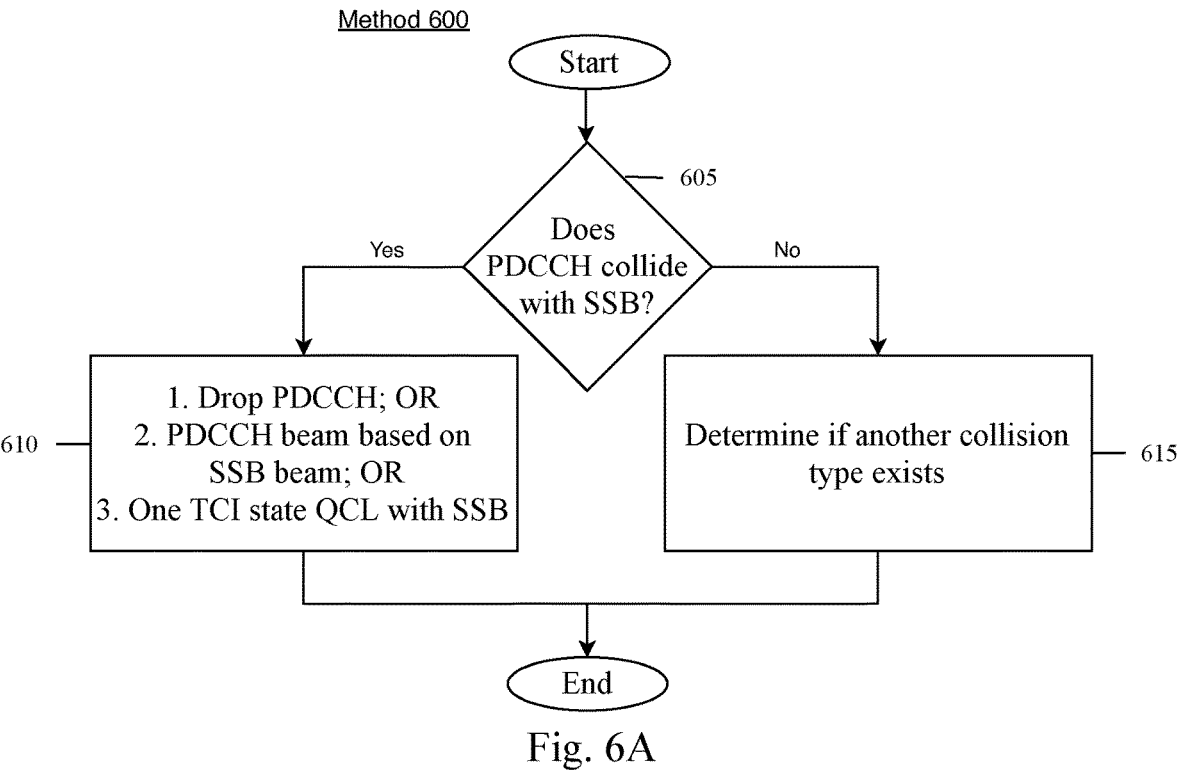
FIGS. 6A-6C show methods of handling signal collisions for multi-TCI states multiplexed in a FDM/SDM manner according to various exemplary embodiments.
Figure 6B:
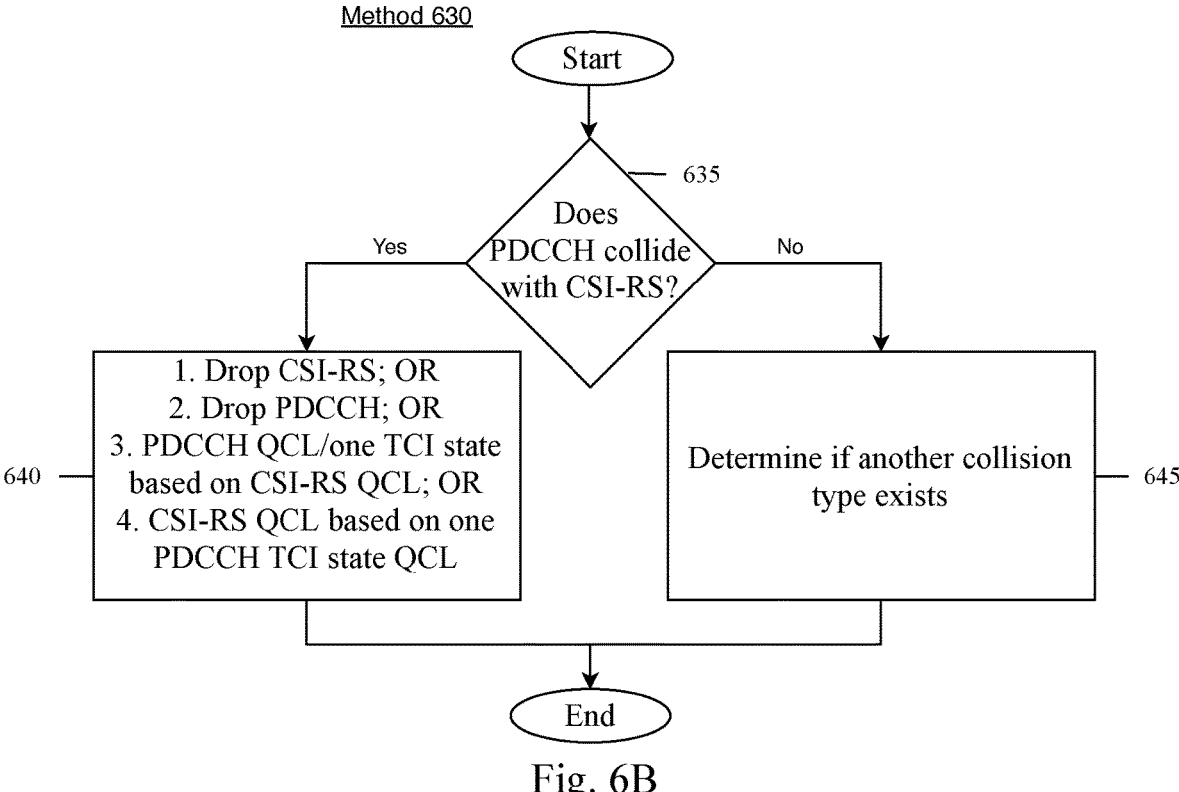
Figure 6C:
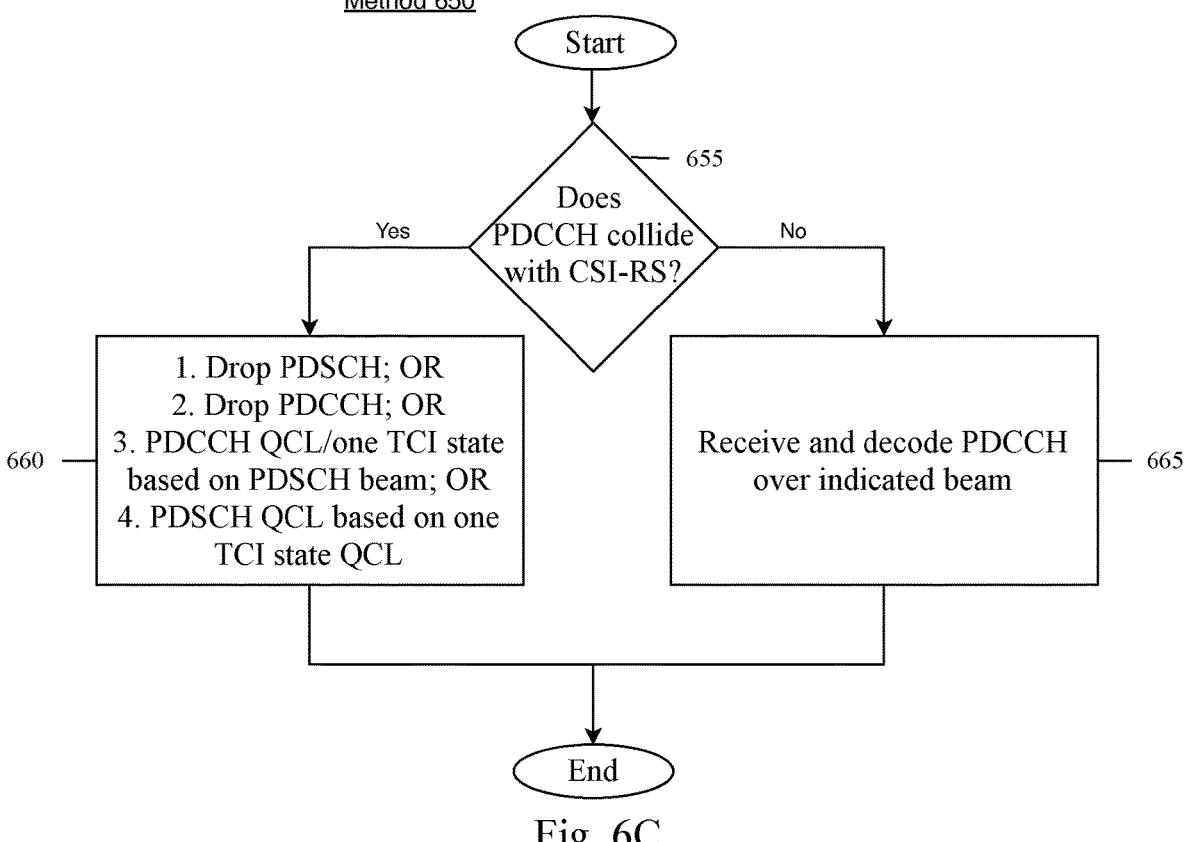

FIGS. 6A-6C show methods of handling signal collisions for multi-TCI states multiplexed in a frequency division multiplexing (FDM) or space division multiplexing (SDM) manner according to various exemplary embodiments. Again, FIGS. 6A-6C shows operations that may be performed in 415 of FIG. 4 when the UE 110 determines that there is a collision in 410 of FIG. 4. When the multi-TCI states are multiplexed using FDM/SDM, multiple ICI states may exist in one or several symbols. As depicted in FIGS. 6A-6C, the UE 110 handles the collision of the PDCCH differently depending on the colliding signal.

FIG. 6A depicts a method 600 of handling a collision of the PDCCH with an SSB. At 605, the UE 110 determines if the PDCCH collides with the SSB. If the PDCCH does collide with the SSB, the UE 110 determines how to handle the collision at 610. In some embodiments, the UE 110 may drop (disregard) the PDCCH. In some embodiments, the UE 110 may override the PDCCH beam and base the PDCCH beam on the SSB beam. In some embodiments, the UE 110 may base one of the TCI states on the QCL of the SSB. That is, one of the two PDCCH beams is overridden so that it is based on the SSB beam. If however, the PDCCH does not collide with the SSB, at 615, the UE 110 determines if another collision type exists. Other collision types are discussed below with respect to FIGS. 6B and 6C.

Referring to FIG. 6B, a method 630 of handling a collision of the PDCCH with a CSI-RS may continue after 615. At 6535, the UE 110 determines if the PDCCH collides with a CSI-RS. If the PDCCH does collide with the CSI-RS, at 640, the UE 110 determines how to handle the collision. In some embodiments, the UE 110 may drop (disregard) the CSI-RS. In some embodiments, the UE 110 may drop the PDCCH. In some embodiments, the UE 110 may base the QCL of the PDCCH or one of the ICI states on the QCL of the CSI-RS. As such, the QCL of the CSI-RS may override one or both of the PDCCH beams. In some embodiments, the UE 110 may base the QCL of the CSI-RS on the QCL of one of the ICI states of the PDCCH. When the QCL of the PDCCH or one ICI state is based on the QCL of the CSI-RS and vice versa, the UE 110 ensures that the PDCCH/one TCI state and the CSI-RS are received via the same beam. If the PDCCH does not collide with the CSI-RS, at 645, the UE 110 determines if another collision type exists. It should be understood that different embodiments may be applied to different types of CSI-RS (e.g. CSI-RS for RSRP/SINR measurement, CSI-RS for beam failure detection, CSI-RS for candidate beam detection, CSI-RS for radio link monitoring, CSI-RS for tracking, and CSI-RS for CSI acquisition). It should also be understood that different embodiments may be applied for an aperiodic CSI-RS having scheduling offset below or above a threshold.

Referring to FIG. 6C, a method 6550 of handling a collision of the PDCCH with a PDSCH may continue after 645. At 655, the UE 110 determines if the PDCCH collides with a PDSCH. If the PDCCH does collide with the PDSCH, the UE 110, at 660, determines how to handle this collision. In some embodiments, the UE 110 may drop (disregard) the PDSCH. In some embodiments, the UE 110 may drop the PDCCH. In some embodiments, the UE 110 may base the QCL of the PDCCH or one of the TCI states on the beam over which the PDSCH is transmitted. In some embodiments, the UE 110 may base the QCL of the PDSCH on the QCL of one of the TCI states. To select the TCI state to utilize in these embodiments, the UE 110 may perform the method 300 or 350 described above with respect to FIGS. 3A and 3B.

If the PDCCH does not collide with the PDSCH, at 665, it is assumed that no collisions exist and the UE 110 may receive and decode the PDCCH over the indicated beam. Although the descriptions of FIG. 6A-6C were made in a specific order, it should be understood that this is only exemplary and that the methods 600, 630, and 650 may be performed in any order and are intended as an elaboration of 415 of method 400.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor cause the processor of a user equipment (UE) to perform operations, comprising:

receiving a plurality of control resource sets (CORE-SETs), wherein each CORESET includes one or more active transmission configuration indicator (TCI) states;

selecting a CORESET from the plurality of CORESETs;

determining whether there are multiple active TCI states associated with the selected CORESET;

when there are multiple active TCI states, selecting one active TCI state to determine a pathloss reference signal (RS) for a physical uplink shared channel (PUSCH) transmission based on at least an explicit indication provided by a network and receiving DCI format 0_0 triggering the PUSCH transmission on a serving cell; and determining the pathloss RS for the PUSCH transmission based on the one active TCI state from the one or more TCI states.

2. The non-transitory computer readable storage medium of claim 1, wherein the explicit indication provided by a next generation NodeB (gNB) of a 5G new radio (NR) network via higher layer signaling.

3. The non-transitory computer readable storage medium of claim 1, wherein the operations further comprise:

determining if any of the plurality of CORESETs are configured with only one active TCI state.

4. The non-transitory computer readable storage medium of claim 3, wherein when one of the plurality of CORESETs is configured with only one active TCI state, a default beam is determined based on the one TCI state.

5. The non-transitory computer readable storage medium of claim 1, wherein a default beam is determined based on a TCI state from the multiple active TCI states that has the lowest ID.

6. A user equipment (UE), comprising:

a transceiver configured to receive a plurality of control resource sets (CORESETs); and a processor configured to:

select a CORESET from the plurality of CORESETs, wherein the CORESET includes one or more active transmission configuration indicator (TCI) states;

determine whether there are multiple active TCI states associated with the selected CORESET;

when there are multiple active TCI states, selecting one active TCI state to determine a pathloss reference signal (RS) for a physical uplink shared channel (PUSCH) transmission based on at least an explicit indication provided by a network and receiving DCI format 0_0 triggering the PUSCH transmission on a serving cell; and determine the pathloss RS for the PUSCH transmission based on the one active TCI state from the one or more TCI states.

7. A method, comprising:

processing a plurality of control resource sets (CORE-SETs);

selecting a CORESET from the plurality of CORESETs, wherein each CORESET includes one or more active transmission configuration indicator (TCI) states;

determining whether there are multiple active TCI states associated with the selected CORESET;

when there are multiple active TCI states, selecting one active TCI state to determine a pathloss reference signal (RS) for a physical uplink shared channel (PUSCH) transmission based on at least an explicit indication provided by a network and receiving DCI format 0_0 triggering the PUSCH transmission on a serving cell; and determining the pathloss RS for the PUSCH transmission based on the one active TCI state from the one or more TCI states.

8. The method of claim 7, wherein the explicit indication is provided by a next generation NodeB (gNB) of a 5G new radio (NR) network via higher layer signaling.

9. The method of claim 7, wherein the operations further comprise:

determining if any of the plurality of CORESETs are configured with only one active TCI state.

10. The method of claim 9, wherein when one of the plurality of CORESETs is configured with one active TCI state, a default beam is determined based on the one active TCI state.

11. The method of claim 7, wherein a default beam is determined based on a TCI state from a plurality of active TCI states that has the lowest ID for a physical downlink shared channel (PDSCH) transmission.

* * * * *